Dec. 22, 1925.
S. M. LUCAS
1,566,333
STATIC PHASE SHIFTING APPARATUS
Filed Oct. 26, 1923
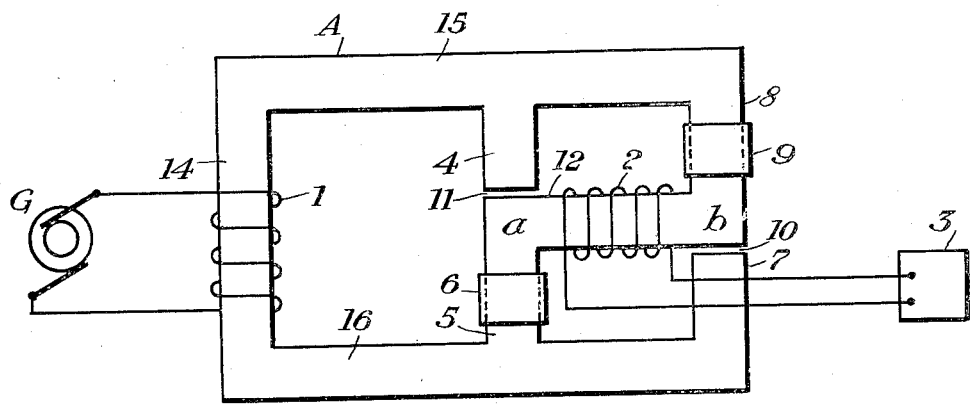
INVENTOR:
S. M. Lucas,
by A. L. Vencill
His Attorney Patented Dec. 22, 1925.

1,566,333

UNITED STATES PATENT OFFICE.

SAMUEL M. LUCAS, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

STATIC-PHASE-SHIFTING APPARATUS.

Application filed October 26, 1923. Serial No. 671,048.

*To all whom it may concern:*

Be it known that SAMUEL M. LUCAS, a citizen of the United States, residing at Pittsburgh, in the county of Allegheny and State of Pennsylvania, has invented certain new and useful Improvements in Static-Phase-Shifting Apparatus, of which the following is a specification.

My invention relates to static phase shifting apparatus, and particularly to apparatus adapted to be interposed between a source of electrical energy and a current consuming device for creating a phase difference between the electromotive force of the source and the electromotive force applied to the device.

I will describe one form of static phase shifting apparatus embodying my invention, and will then point out the novel features thereof in claims.

The accompanying drawing is a view, partly diagrammatic, showing one form of static phase shifting apparatus embodying my invention.

Referring to this drawing the reference character A designates the core of a "phase shifter" or phase shifting transformer, and is made of some suitable magnetizable material such as laminated soft iron. This core is substantially U-shaped and comprises a base 14 and two parallel arms 15 and 16. The two arms 15 and 16 are connected near their right hand ends by two parallel magnetic paths, one comprising a pair of oppositely disposed legs 4 and 5 separated by an air gap 11, and the other comprising a similar pair of oppositely disposed legs 8 and 7 separated by an air gap 10. The upper end *a* of leg 5 and the lower end *b* of leg 8 are connected together by means of a magnetic bridge 12. Leg 8 is provided with a ferrule 9 of some electro-conductive material such as copper, and leg 5 is provided with a similar ferrule 6.

The base of core A is provided with a winding 1 connected with a suitable source of alternating current such as a generator G. It is evident that current flowing in winding 1 creates an alternating magnetic flux in core A. A portion of this flux flows from arm 15 through leg 4, air gap 11, and leg 5, back to arm 16; and a portion flows from arm 15, through leg 8, air gap 10 and leg 7 back to arm 16. The ferrules 9 and 6 are effective to cause the flux through these ferrules to lag behind the current in winding 1 whereas the air gaps 11 and 10 increase the reluctance of the magnetic circuit but do not displace the phase of the flux with respect to the current. It is therefore obvious that there will be created between points *a* and *b* an alternating difference of magnetic potential. This magnetic potential will set up in bridge 12 an alternating flux which will be displaced in phase from the flux in base 14. The bridge 12 is provided with a secondary winding 2 which is connected with a current consuming device wherein the current with shifted phase is wanted, which device is indicated diagrammatically at 3. The flux which links this winding will, of course, induce an electromotive force in this winding which is in quadrature with the flux. It is therefore plain that the device 3 is supplied with an alternating electromotive force which is out of phase with the current in winding 1. The amount of this phase displacement may be adjusted within wide limits by properly proportioning the reluctances of the air gaps 11 and 10 and the resistances of the ferrules 9 and 6.

Considering the matter from another angle, the flux generated in core A by current in winding 1 flows over two paths as follows: Part of the flux flows from arm 15, through leg 4, air gap 11, bridge 12, air gap 10, and leg 7 to arm 16; and part of the the flux flows from arm 15, through leg 8, bridge 12 and leg 5 to arm 16. These two fluxes are displaced in phase by the action of the ferrules on one path and the air gaps in the other path, and the resulting total flux in bridge 12 is the vectorial sum of the two fluxes traversing the bridge. The electromotive force induced in winding 2 will be in quadrature with the flux in bridge 12 and will therefore be displaced in phase with respect to the electromotive force applied to winding 1.

Although I have herein shown and described only one form and arrangement of static phase shifting apparatus embodying my invention, it is understood that various changes and modifications may be made therein within the scope of the appended claims without departing from the spirit and scope of my invention.

Having thus described my invention, what I claim is:

1. In combination, a winding on a core, a bridge on said core, means for supplying an alternating electromotive force to said winding to create a periodic flux in said core, a second winding on said bridge, and means for displacing the relative phases of the fluxes in said bridge and said core so that the electromotive force induced in said second winding is out of phase with respect to said first electromotive force.

2. In combination, a magnetic circuit comprising two pairs of magnetizable legs the two legs of each pair being oppositely disposed and separated by an air gap, a magnetic bridge for connecting one leg of one pair with the opposite leg of the other pair, a primary winding for establishing an alternating flux in said circuit, and a secondary winding on said bridging member.

3. In combination, a magnetic circuit comprising two pairs of magnetizable legs the two legs of each pair being oppositely disposed and the circuit through each pair of legs having considerable reluctance, a magnetic bridge for connecting one leg of one pair with the opposite leg of the other pair, a primary winding for establishing an alternating flux in said circuit, an electroconductive ferrule on at least one of said legs, and a secondary winding on said bridging member.

4. In combination, a magnetic circuit comprising two pairs of magnetizable legs the two legs of each pair being oppositely disposed and separated by an air gap, an electroconductive ferrule on one leg of one pair and a similar ferrule on the opposite leg of the other pair, a magnetic bridge for connecting together the end of the two legs provided with ferrules, means for creating an alternating flux in said magnetic circuit and a secondary winding linked by flux in said bridge.

5. A static phase shifter comprising two magnetic paths having a bridge in common, means for creating magnetic flux in said paths, means associated with at least one path for displacing the phase of the flux in one path with respect to the flux in the other path, and a winding inductively related to said bridge.

6. A static phase shifter comprising two magnetic paths having a bridge in common, means for creating magnetic flux in said paths, a circuit of low resistance inductively related with one said path for displacing the phase of the flux in said one path with respect to the flux in the other path, and a winding inductively related to said bridge.

7. A static phase shifter comprising two magnetic paths having a bridge in common, means for creating in said two paths magnetic fluxes which flow in opposite directions in said bridge at a given instant, means associated with at least one path for displacing the phase of the flux in one path with respect to the flux in the other path, and a winding inductively related to said bridge.

8. A static phase shifter comprising two magnetic paths, means for creating magnetic flux in said paths, means associated with at least one such path for displacing the phase of the flux in one path with respect to the flux in the other path, and a winding arranged to be linked by the vector sum of the fluxes in said paths.

In testimony whereof I affix my signature.

SAMUEL M. LUCAS.

DISCLAIMER 1,566,333.—*Samuel M. Lucas*, Pittsburgh, Pa. STATIC-PHASE-SHIFTING APPARATUS. Patent dated December 22, 1925. Disclaimer filed June 22, 1933, by the assignee, *The Union Switch & Signal Company.*

Hereby enters the following disclaimer, to wit:

Your petitioner hereby disclaims the subject matter of claims 1, 5, 6, 7, and 8.

[*Official Gazette July 18, 1933.*]